US008863148B1

(12) United States Patent
Chow et al.

(10) Patent No.: US 8,863,148 B1
(45) Date of Patent: Oct. 14, 2014

(54) SMALL DEBUG PRINT

(75) Inventors: Long Chow, Saratoga, CA (US); James K. Jan, San Jose, CA (US); Matthew L. Semersky, Santa Clara, CA (US); Chen Fan, Cupertino, CA (US); Xiaohua Luo, San Jose, CA (US); Frank Huang, Pleasanton, CA (US); Robert Lee, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 1726 days.

(21) Appl. No.: 11/960,392

(22) Filed: Dec. 19, 2007

Related U.S. Application Data

(60) Provisional application No. 60/884,079, filed on Jan. 9, 2007, provisional application No. 60/941,093, filed on May 31, 2007.

(51) Int. Cl.
*G06F 9/54* (2006.01)

(52) U.S. Cl.
USPC ........... 719/313; 719/320; 717/125; 717/128; 714/4.1

(58) Field of Classification Search
None
See application file for complete search history.

(56) References Cited

U.S. PATENT DOCUMENTS

| | | | | |
|---|---|---|---|---|
| 5,119,377 A | * | 6/1992 | Cobb et al. | 714/38.11 |
| 5,276,881 A | * | 1/1994 | Chan et al. | 717/147 |
| 5,701,487 A | * | 12/1997 | Arbouzov | 717/124 |
| 7,120,901 B2 | * | 10/2006 | Ferri et al. | 717/128 |
| 7,146,600 B2 | * | 12/2006 | Zook | 717/106 |
| 7,571,431 B2 | * | 8/2009 | Hampapuram et al. | 717/141 |
| 7,765,525 B1 | * | 7/2010 | Davidson et al. | 717/124 |
| 2003/0187977 A1 | * | 10/2003 | Cranor et al. | 709/224 |
| 2003/0231630 A1 | * | 12/2003 | Messenger | 370/392 |
| 2004/0221262 A1 | * | 11/2004 | Hampapuram et al. | 717/113 |

OTHER PUBLICATIONS

Jamsa et al.; "Jamsa's C/C++ Programmer's Bible"; 1998; Jamsa Press; sections 62 and 223, (6 pages).*
Bluetooth® "Specification of the Bluetooth System"; Specification vol. 0; Master Table of Contents & Compliance Requirements; Nov. 4, 2004; 74 pgs.
Bluetooth® "Specification of the Bluetooth System"; Specification vol. 1; Architecture & Terminology Overview; Nov. 4, 2004; 92 pgs.
Bluetooth® "Specification of the Bluetooth System"; Specification vol. 2; Core System Package [Controller volume]; Nov. 4, 2004; 814 pgs.
Bluetooth® "Specification of the Bluetooth System"; Specification vol. 4; Core System Package [Host volume]; Nov. 4, 2004; 250 pgs.
IEEE P802.11g/D8.2, Apr. 2003 (Supplement to ANSI/IEEE Std 802.11 1999(Reaff 2003)); IEEE P802.11g/D8.2 Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; 2003 IEEE; 69 pgs.

(Continued)

*Primary Examiner* — H S Sough
*Assistant Examiner* — Umut Onat

(57) ABSTRACT

A network interface includes a firmware module that generates a first message based on a first print macro call and a memory module that stores the first message. The first message comprises a subset of data indicative of the first print macro call.

30 Claims, 10 Drawing Sheets

(56) References Cited

OTHER PUBLICATIONS

International Standard; ISO/IEC 8802-11; ANSI/IEEE Std 802.11, First edition 1999-00-00; Information technology—Telecommunications and information exchange between systems—Local and metropolitan area networks—Specific requirements—Part 11: Wireless LAN Medium Access Control (MAC) and Physical Layer (PHY) specifications; Std 802.11, 1999 edition; Aug. 20, 1999; 531 pgs.

802.11h™; "IEEE Standard for Information technology—Telecommunications and information exchange between systems—Local and metropolitan area networks—Specific requirements Part 11: Wireless LAN Medium Access Control (MAC) and Physical Layer (PHY) specifications; Amendment 5: Spectrum and Transmit Power Management Extensions in the 5 GHz band in Europe"; IEEE Computer Society; Oct. 14, 2003; 74 pgs.

Syed Aon Mujtaba, Agere Systems; "IEEE P802.11 Wireless LANs"; doc.: IEEE802.11-04/0889r6; May 2005; 131 pgs.

802.16™; "IEEE Standard for Local and metropolitan area networks Part 16: Air Interface for Fixed Broadband Wireless Access Systems"; IEEE Computer Society and the IEEE Microwave Theory and Techniques Society; Apr. 8, 2002; 349 pgs.

802.16™; "IEEE Standard for Local and metropolitan area networks Part 16: Air Interface for Fixed Broadband Wireless Access Systems—Amendment 2: Medium Access Control Modifications and Additional Physical Layer Specifications for 2-11GHz"; IEEE Computer Society and the IEEE Microwave Theory and Techniques Society; Oct. 1, 2004; 892 pgs.

* cited by examiner

| Debug Print Statement | DBGS ((ADHOCPS_INIT, "%u%cu, u32, u8)) |
|---|---|
| Short String | "305419896 171" |
| Full Format String | "adhoc ps tbtt_count %s sleep_count %s" |
| Full String | "adhoc ps tbtt_count 305419896 sleep_count 171" |

FIG. 4

| Type | Type Value | Debug Print Macro |
|---|---|---|
| Variable Argument List | 0 | DBGS |
| State Data | 1 | None Applicable |
| Host Interface Tracing | 2 | DBGS_H |

FIG. 5

SMALL DEBUG PRINT

RELATED APPLICATION

This application claims the benefit of U.S. Provisional Applications No. 60/884,079, filed on Jan. 9, 2007, and 60/941,093, filed May 31, 2007, which are incorporated herein by reference.

BACKGROUND

1. Technical Field

The present disclosure relates generally to debug operations and, more particularly, to efficient memory management during debug operations.

2. Related Art

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Errors or faults (i.e. "bugs") in a computer program, or software program, often interfere with the proper operation of the computer program. Bugs can corrupt instructions of the computer program and/or variables in memory. Software programs embedded in a hardware device are referred to as firmware programs.

Computer programs known as "debuggers" test and "debug" (i.e. locate and eliminate) bugs in computer programs (e.g. software programs or firmware programs) that the debugger operates upon. Debuggers monitor the execution of the computer program in order to detect bugs. During a debug operation, debuggers often display or print output (i.e., data) generated by code of the computer program during execution. The output is generated based on print function commands that are executed at various points throughout the debug operation. Debug operations are often executed by firmware that can be included within various devices.

For example, network interfaces include firmware and associated memory to execute print function commands called for by debug programs. Typically, during a debug session of a computer program stored on the network device, data generated by the target computer program is output for analysis by a user/operator. Data is output in readable form to the user/operator based on the print function commands included within the debug program. Print function commands executed during a debug operation are referred to as debug print operations.

Debug print operations often require a significant amount of memory for storage. However, the memory that is typically available on various components (e.g. system-on-chip circuits) of the network interface that can be used during debug operations is scarce. As a result, performance of debug operations executed within the network interface fail to reach optimal levels.

BRIEF SUMMARY

The present invention is defined by the following claims, and nothing in this section should be taken as a limitation on those claims.

By way of introduction, the preferred embodiments below provide a network interface that includes a firmware module that generates a first message based on a first print macro call and a memory module that stores the first message. The first message comprises a subset of data indicative of the first print macro call.

In one preferred embodiment, the first message includes a first identification parameter and a value field based on the first print macro call. The first identification parameter corresponds to predetermined characters associated with the first print macro call and the value field does not include the predetermined characters associated with the first print macro call. The value field includes one of a variable number of arguments and state data of the firmware module with a host device.

A network interface that includes firmware means for generating a first message based on a first print macro call and memory means for storing the first message. The first message comprises a subset of data indicative of the first print macro call.

In other features, the first message includes a first identification parameter and a value field based on the first print macro call, wherein the first identification parameter corresponds to predetermined characters associated with the first print macro call and the value field does not include predetermined characters associated with the first print macro call. The value field includes one of a variable number of arguments and state data of the firmware means with a host device.

In other features, a network device comprising the network interface and further comprises viewer means for identifying the predetermined characters based on the first identification parameter and that generates a complete set of data associated with the first print macro call based on the predetermined characters and the variable number of arguments. The memory means stores the first message after a host device selectively enables the first print macro call based on mask data and the first identification parameter. The firmware means generates the first message and the memory means stores the first message when the first print macro call is enabled. The firmware means dequeues the first message from the memory means for transmission to at least one of a plurality of output destinations.

In other features, the host device selectively enables a plurality of print macro calls based on the mask data and a plurality of identification parameters that respectively correspond to each of the plurality of print macro calls, wherein the plurality of print macro calls and the plurality of identification parameters include the first print macro call and the first identification parameter, respectively. The firmware means respectively generates a plurality of messages based on the plurality of print macro calls and stores the plurality of messages to the memory module when the plurality of print macro calls are enabled, wherein the plurality of messages include the first message. The firmware means transmits at least one of the plurality of messages from the memory means to the host device based on a request command received from the host device. The firmware means transmits at least one of the plurality of messages from the memory means to a network analyzer based on a request command received from a node, wherein the node communicates with an access point of a network system.

In other features, the firmware means further generates the state data that includes at least one of a state of each of a plurality of state machines of the firmware means, a state of each of a plurality of global variables of the firmware means, and a state of each of a plurality of media access control registers of the firmware means. The firmware means generates a data packet that includes one of the first message and the state data for transmission to at least one of the plurality of output destinations. The plurality of output destinations includes the host device and a network analyzer.

In other features, the firmware means transmits the state data to the host device based on a request command received from the host device and the firmware means transmits the state data to a network analyzer based on a different request command received from a node, wherein the node communicates with an access point of a network system. The firmware means broadcasts the state data to a network system based on a request command received from a node, wherein the node is not associated with an access point of the network system. A wireless network means that includes the network interface.

A computer program stored for use by a processor for operating a network interface includes generating a first message based on a first print macro call and storing the first message. The first message comprises a subset of data indicative of the first print macro call.

In other features, the first message includes a first identification parameter and a value field based on the first print macro call, wherein the first identification parameter corresponds to predetermined characters associated with the first print macro call and the value field does not include predetermined characters associated with the first print macro call. The value field includes one of a variable number of arguments and state data of a firmware module with a host device.

In other features, the program further comprises identifying the predetermined characters based on the first identification parameter and generating a complete set of data associated with the first print macro call based on the predetermined characters and the variable number of arguments. The program further comprises storing the first message after the host device selectively enables the first print macro call based on mask data and the first identification parameter. The program further comprises generating the first message and storing the first message to a memory module when the first print macro call is enabled. The program further comprises dequeuing the first message from the memory module for transmission to at least one of a plurality of output destinations.

In other features, the program further comprises selectively enabling a plurality of print macro calls based on the mask data and a plurality of identification parameters that respectively correspond to each of the plurality of print macro calls, wherein the plurality of print macro calls and the plurality of identification parameters include the first print macro call and the first identification parameter, respectively. The program further comprises respectively generating a plurality of messages based on the plurality of print macro calls and storing the plurality of messages to the memory module when the plurality of print macro calls are enabled, wherein the plurality of messages include the first message. The program further comprises transmitting at least one of the plurality of messages from the memory module to the host device based on a request command received from the host device. The program further comprises transmitting at least one of the plurality of messages from the memory module to a network analyzer based on a request command received from a node, wherein the node communicates with an access point of a network system that includes the network interface.

In other features, the program further comprises generating the state data that includes at least one of a state of each of a plurality of state machines of the firmware module, a state of each of a plurality of global variables of the firmware module, and a state of each of a plurality of media access control registers of the firmware module. The program further comprises generating a data packet that includes one of the message and the state data for transmission to at least one of the plurality of output destinations. The plurality of output destinations include the host device and a network analyzer.

In other features, the program further comprises transmitting the state data to the host device based on a request command received from the host device and transmitting the state data to a network analyzer based on a different request command received from a node, wherein the node communicates with an access point of a network system that includes the network interface. The program further comprises broadcasting the state data to a network system that includes the network interface based on a request command received from a node, wherein the node is not associated with an access point of the network system.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The preferred embodiments will now be described with reference to the attached drawings.

BRIEF DESCRIPTION OF THE DRAWINGS

FIG. 4 is a table illustrating an exemplary operation of a print system according to the present disclosure;

FIG. 5 is a table illustrating a plurality of types of debug print operations;

FIG. 9($b$) is a functional block diagram of a digital versatile disk (DVD);

FIG. 9($c$) is a functional block diagram of a high definition television;

FIG. 9($d$) is a functional block diagram of a vehicle control system;

FIG. 9($e$) is a functional block diagram of a cellular phone;

FIG. 9($f$) is a functional block diagram of a set top box;

FIG. 9($g$) is a functional block diagram of a media player; and

FIG. 9($h$) is a functional block diagram of a VoIP phone.

DETAILED DESCRIPTION OF THE PRESENTLY PREFERRED EMBODIMENTS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views. The following description is merely exemplary in nature and is in no way intended to limit the disclosure, its application, or uses. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

By way of introduction, the embodiments described herein are related to network devices that employ "debug" programs and are merely exemplary in nature. More particularly, a system-on-chip circuit (SOC) of a network device includes firmware that implements debug programs in order to monitor various programs running on the network interface and identify "bugs" (i.e., errors or faults) within the various programs that may inhibit proper operation of the network interface. The present disclosure describes a print system that minimizes the memory requirements of debug print operations within a system-on-chip circuit (SOC) of a network interface, thereby increasing the performance and efficiency of debug print operations during a debug session, or operation.

Figure 1:
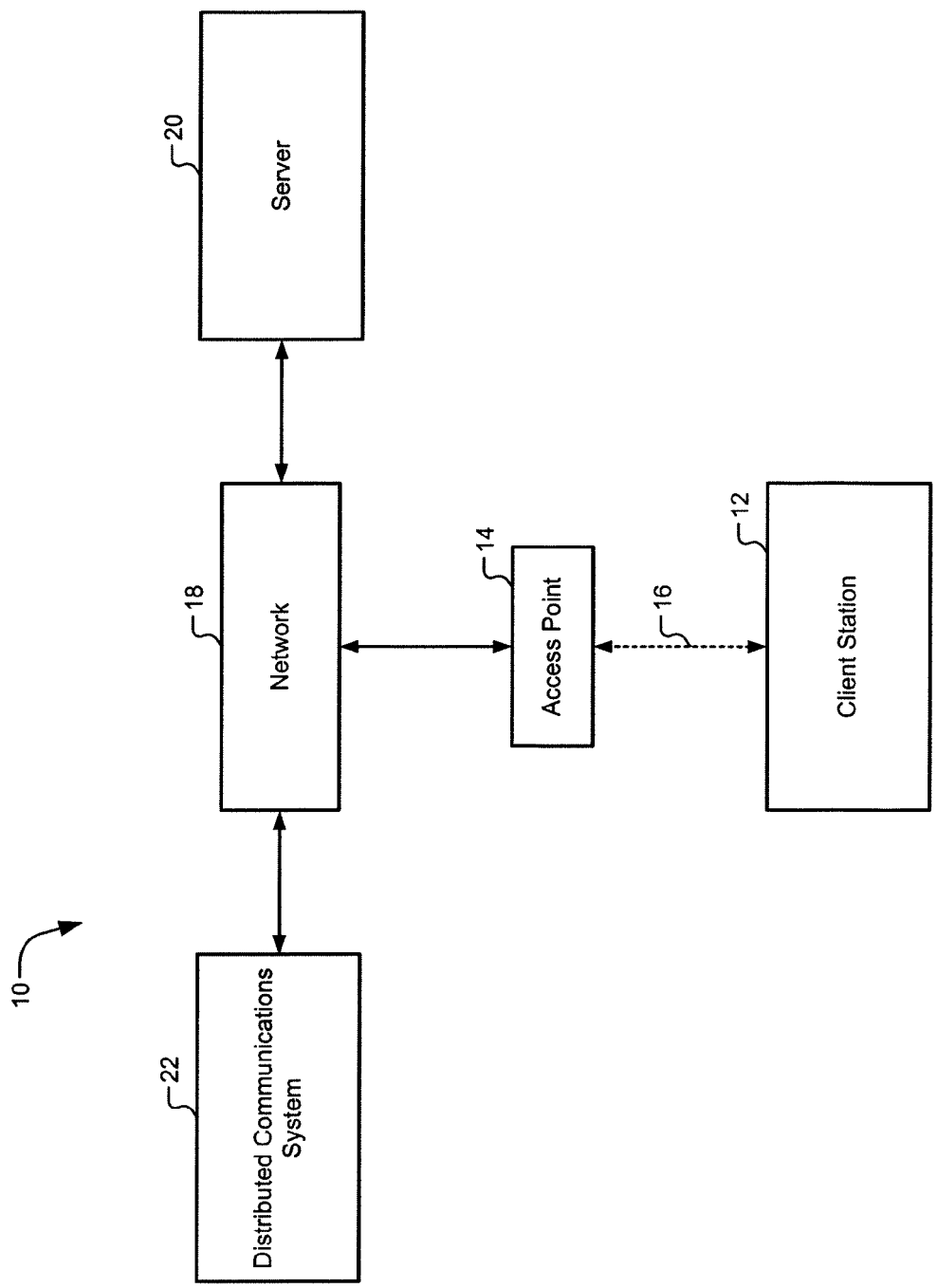
FIG. 1 is a functional block diagram of an exemplary wireless network according to the present disclosure.

Referring now to FIG. 1, an exemplary wireless network 10 is shown. Wireless communications of the wireless network 10 can be compliant with various protocols including at least one of the Institute of Electrical and Electronics Engineers (IEEE) standards 802.11, 802.11a, 802.11b, 802.11g, 802.11h, 802.11n, 802.16, 802.16a, 802.16e, 802.16-2004, and 802.20, and/or the Bluetooth standard published by the Bluetooth Special Interest Group (SIG). The aforementioned standards are hereby incorporated by reference in their entirety.

The wireless network 10 includes one or more client stations 12 and one or more access points 14. Access points 14 connect the client stations 12 (i.e., communication devices) to form the wireless network 10. Typically, the access points 14 connect to a network 18 (e.g., a wired network) and can relay data between the client stations 12 and various wired devices (not shown) of the network 18. The client station 12 implements the print system of the present disclosure. The client station 12 may include, but is not limited to, a desktop computer, a personal digital assistant (PDA), a mobile phone, a laptop, a personal computer (PC), a printer, a digital camera, an internet protocol (IP) phone.

In the present embodiment, the client station 12 and the access point 14 transmit and receive wireless signals 16 to enable communication among users/operators of the wireless network 10. The access point 14 represents a node in the network 18 and may include, but is not limited to, a network analyzer (e.g. a "sniffer") that can detect and log data transmitted over a digital network or part of a network. The network 18 may be a local area network (LAN), a wide area network (WAN), or another network configuration. The network 18 may include other nodes such as a server 20 and may be connected to a distributed communications system 22 such as the Internet.

Figure 2:
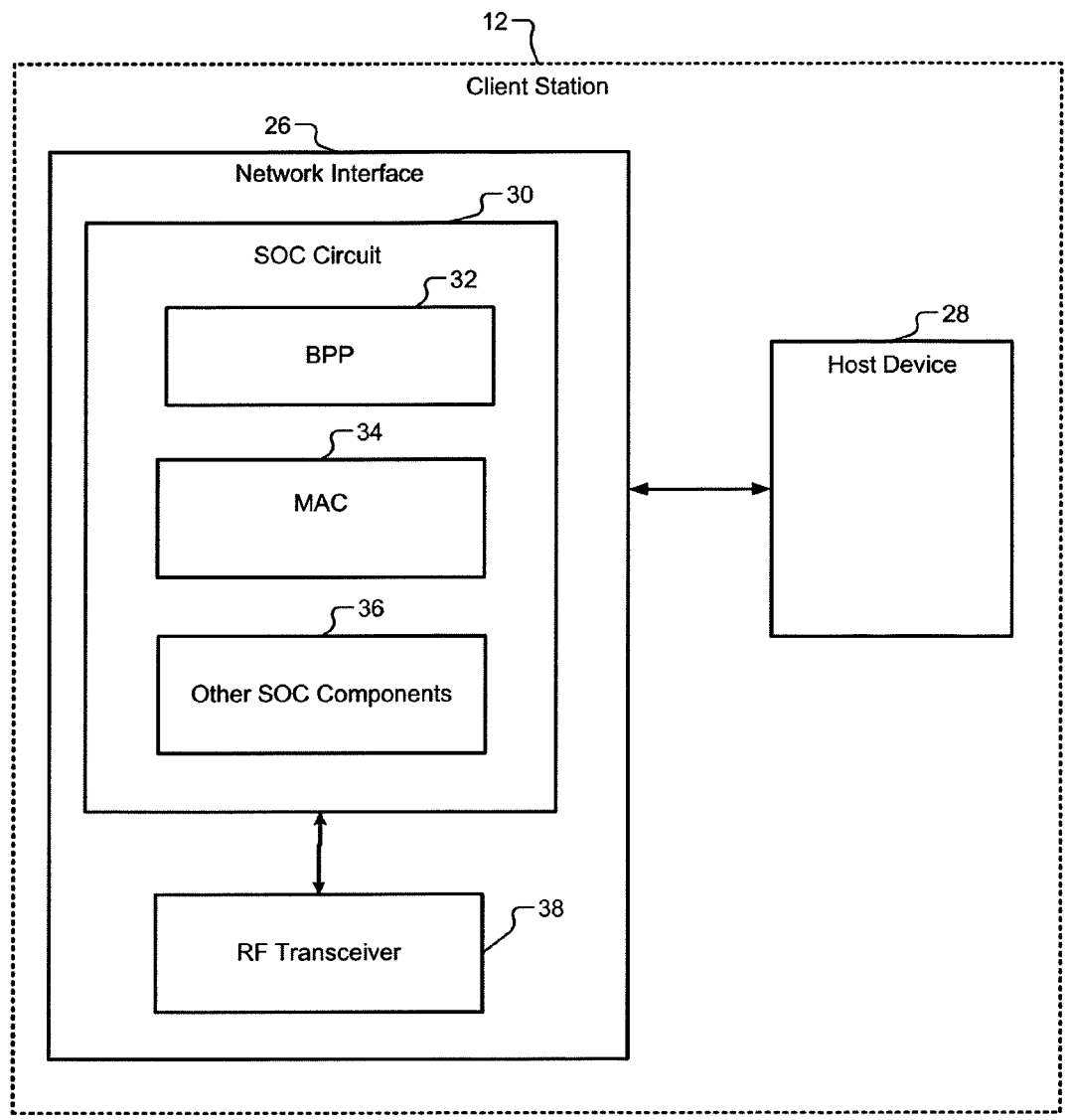
FIG. 2 is a functional block diagram of an exemplary client station including a network interface and host device according to the present disclosure.

Referring now to FIG. 2, the client station 12 is shown in more detail. The client station 12 implements the print system and is shown to include a network interface 26 and a host device 28. A SOC circuit 30 of the network interface 26 includes a baseband processor (BBP) 32, a media access control (MAC) device 34, and other SOC components, identified collectively at 36, such as interfaces, firmware, memory, and/or processors. A radio frequency (RF) transceiver 38 along with the BBP 32 communicate with the MAC device 34. The RF transceiver 38 transmits/receives data to/from various access points in the exemplary wireless network 10. The present implementation illustrates a wireless local area network (WLAN) network system, though those skilled in the art will appreciate that various other implementations of the print system are contemplated within other wireless network configurations such as a Worldwide Interoperability for Microwave Access (WiMAX) and Bluetooth.

Figure 3:
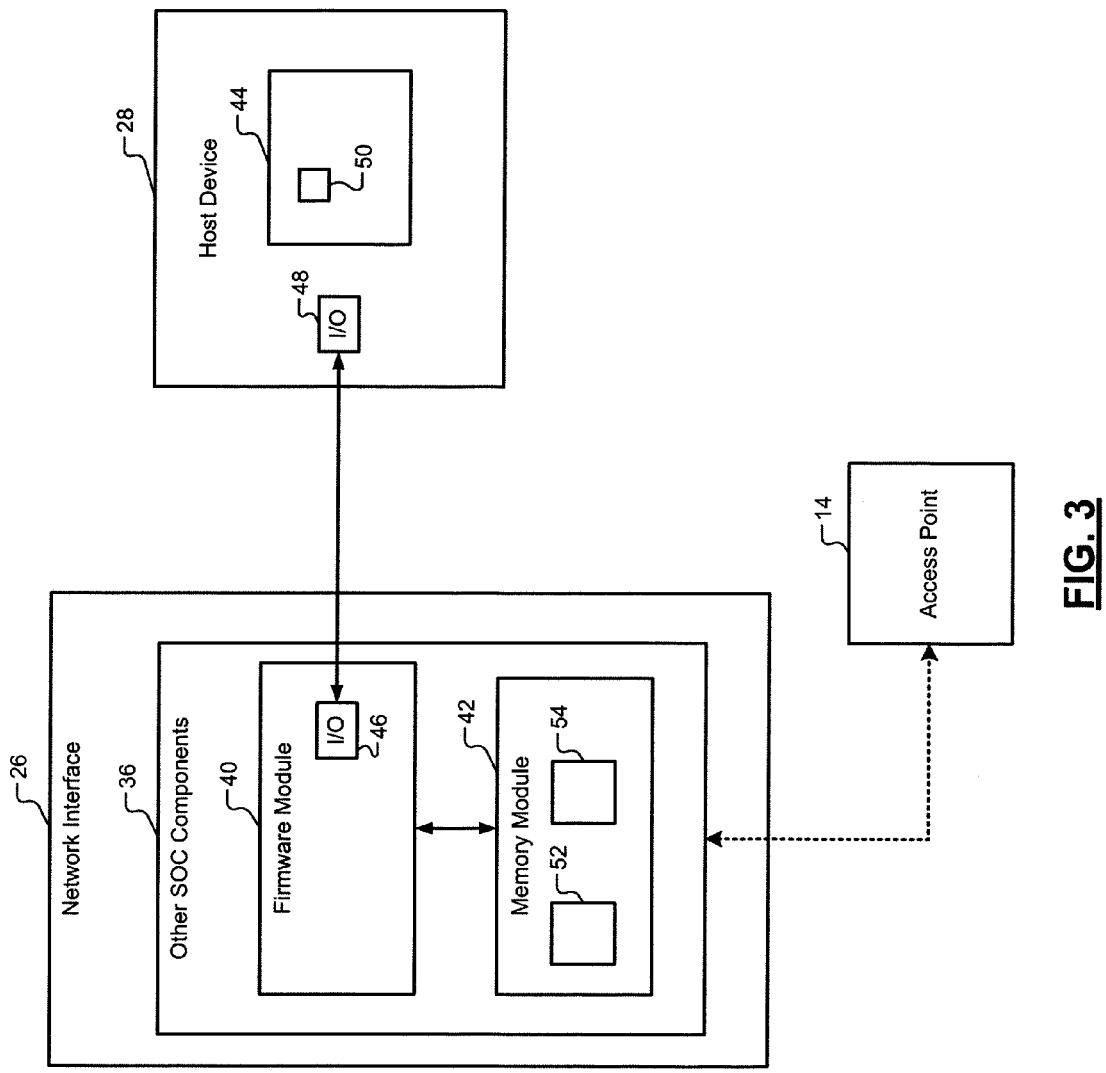
FIG. 3 is a functional block diagram of other system-on-chip components of the network interface according to the present disclosure.

Referring to FIG. 3, the other SOC components 36 are shown in further detail. The other SOC components 36 include, but are not limited to, a firmware module 40 and a memory module 42. In the present implementation, the firmware module 40 includes firmware that implements debug programs in order to monitor various programs running on the network interface 26 and isolate bugs that may exist within the various programs in accordance with the present disclosure.

The firmware module 40 selectively communicates with the memory module 42, a controller module 44 of the host device 28, and the access point 14. The host device 28 communicates with the firmware module 40 via input/output (I/O) modules 46, 48. The controller module 44 can include, but is not limited to, a central processing unit and/or a direct memory access (DMA) controller. The controller module 44 of the host device 28 includes a viewer module 50 that stores and retrieves constant characters (i.e. predetermined characters) associated with various debug macro calls.

The memory module 42 includes "trace" memory 52 and a "vitals" memory 54. The trace memory 52 and vitals memory 54 serve as data repositories for the firmware module 40. The trace memory 52 accumulates "debug" messages generated by the firmware module 40 during a debug operation. Debug messages include, in part, data generated by a target program (i.e., a program being tested by a debug operation) and output (i.e., transmitted to one or more output destinations) in response to a debug print operation during a debug operation. Users/operators of the network 10 analyze the debug messages to isolate and rectify bugs occurring within the target program. The generation of debug messages will be discussed in further detail below. The vitals memory 54 stores the state data, or "vitals" data, that includes current states of each of a plurality of state machines, a plurality of global variables, and plurality of MAC registers of the firmware module 40.

Referring now to FIGS. 3, 4, and 5, an exemplary debug print operation is discussed in more detail. FIG. 4 illustrates the progression of data through the execution of the exemplary debug print operation. The firmware module 40 initiates a debug print operation when the firmware module 40 determines that a debug macro call has been enabled. In the present implementation, the host device 28 selects various debug macro calls to be enabled and designates output destinations (e.g. the host device 28 and/or various nodes) for the firmware module 40 to transmit debug messages and/or state data to based on a debug configure command.

The firmware module 40 can process several types of debug macro calls. In the present example depicted in FIG. 4, the debug print statement of "DBGS ((ADHOCPS_INIT, "%u%cu, u32, u8))" includes a debug macro call of "DBGS" that corresponds to a variable list of arguments (an argument list) type of debug print operation.

FIG. 5 is a table that illustrates a plurality of types of debug print operations such as a "host interface tracing" type of debug print operation. The host interface tracing type generates data that characterizes states of an interface between the host device 28 and the firmware module 40 (i.e. between the I/O module 46, 48). In the present implementation, the data of the host interface tracing type of debug print operation is generated in a binary format.

Additionally, the exemplary debug print statement further includes an identification parameter (ID) of "ADHOCPS_INIT", a short format string parameter of "%u%cu", and a list of arguments (argument list) including a first argument "u32" and a second argument "u8". The ID of "ADHOCPS_INIT" corresponds to a distinct set of predetermined characters known as a full format string. The full format string is discussed in further detail below. In the present implementation, the ID includes a 13-bit value. Further, the present implementation contemplates a plurality of IDs that each represents a distinct DBGS macro call.

The host device 28 enables various debug macro calls based on an enablement field included within the debug configure command. The enablement field can employ several modes to activate various debug macro calls such as global enable mode, a range enable mode, or a list enable mode. The global enable mode enables each ID detected by the firmware module 40 during a debug operation. The range enable mode specifies a range of IDs as enabled and the list enable mode specifies a list of IDs as enabled.

The "%u" parameter and the "%cu" parameter of the short format string parameter are conversion specifiers that denote that the first argument "u32" and the second argument "u8" include an unsigned 32-bit value and an unsigned 8-bit value, respectively. In the present example, the first and second arguments "u32" and "u8" equal decimal values of "305419896" and "171", respectively. The arguments represent variable values generated during the course of debug operation. Although two arguments are illustrated, it is anticipated that the argument list may vary in number and the arguments may vary in type, and the present disclosure is not limited to this exemplary embodiment.

The firmware module 40 parses the short format string parameter and determines each type of argument contained within the argument list in order to convert each argument into corresponding ASCII characters to transmit to the host device 28. The firmware module 40 constructs a short string of "305419896 171". It is noteworthy that the short string includes arguments (i.e. variable values) and does not include predetermined characters associated with the ID. The firmware module 40 transmits the short string to the host device 28 along with the ID.

The host device 28 receives the ID of "ADHOCPS_INIT" and the short string of "305419896 171" associated with the debug macro call discussed above. The viewer module 50 of the host device 28 identifies a full format string corresponding to the debug macro call based on the received ID and a full format string table (not shown) stored in the host device 28. In the present example, the viewer module 50 determines that the full format string of "adhoc ps tbtt_count %s sleep_count %s" corresponds to the ID of "ADHOCPS_INIT". In the present implementation, the viewer module 50 proceeds to substitute the first decimal value of "305419896" for the first conversion specifier "%s" detected within the full format string from left to right and substitutes the second exemplary decimal value of "171" for the second conversion specifier "%s". Thus the viewer module 50 outputs (i.e. prints) a full string of "adhoc ps tbtt_count 305419896 sleep_count 171".

In other words, the host device 28 generates and prints a full string (i.e. a set of data that includes predetermined characters and variable values) based on a portion, or subset, of data, thereby reducing the amount of memory used within the SOC circuit 30 during a debug print operation.

Figures 6, 7:
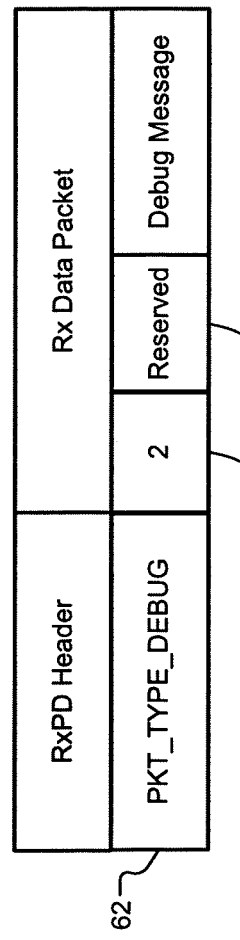
FIG. 6 illustrates a "debug" message according to the present disclosure.
FIG. 7 illustrates a format of a transmission of the exemplary debug message.

Referring now to FIG. 6, an organizational structure of an exemplary debug message is shown. The firmware module 40 generates the exemplary debug message when the exemplary debug macro call discussed in FIG. 4 is enabled.

The debug message includes various fields with values based on the exemplary debug macro call. The set of fields includes a type field, a sequence number field, an ID field, a time stamp field, and a value field. The type field, the sequence number field, the ID field, the time stamp field, and the value field include data that respectfully indicates the type, a sequence, the ID, and a timestamp, and value characterizing the debug macro call.

The debug message of FIG. 6 is shown to include exemplary values of each of the various fields. In the present example, the value field of the exemplary debug message includes "305419896 171". In other words, the value field includes the exemplary short string of FIG. 4. In the present implementation, a format of the value field is based on the type of debug macro call. As noted above, the exemplary debug macro call includes a variable argument list type (i.e. a type of "0"). As such, the format of the value field in the exemplary embodiment includes a short string.

Each debug message generated by the firmware module 40 (i.e. each debug macro call that is enabled) is enqueued to the trace memory 52 of the memory module 42. In the present implementation, the storage capacity of the trace memory 52 is configurable. Each of the debug messages is either periodically dequeued from the trace memory 52 or all the debug messages in the trace memory 52 are dumped on command to one or more output destinations. When a debug message is dequeued from the trace memory 52, the firmware module 40 transmits the debug message to at least one of output destinations (e.g. the host device 28 or a node within the network 10). The debug configure command initially transmitted from the host device 28 establishes and controls periodic dequeue operations. It is anticipated that the dequeue operations are executable at variable speeds.

Alternatively, one or more of the debug messages stored in the trace memory 52 can be transmitted on command to either the host device 28 or a node within the network 10 based on various memory request commands. Typically, the host device 28 or a node monitoring the client station 12 issues a memory request command via a generic application programming interface (API) to request a selected segment of memory.

Additionally, the host device 28 and a node monitoring the client station 12 can request the state data stored in the vitals memory 54 on command via various memory request commands. If the client station 12 is not associated with an access point 14, the firmware module 40 broadcasts the vitals data, preferably for a node such as a sniffer to detect, based on a request from another node associated with the client station 12. This operation is known as an "auto dump". In the present implementation, the firmware module 40 performs the auto dump operation periodically (e.g. every 15 seconds).

FIG. 7 illustrates a transmission 60 of the exemplary debug message. Prior to transmitting state data or a debug message to a selected output destination, the firmware module 40 generates a data packet that includes the state data or the debug message. The firmware module 40 encapsulates the data packet in a header corresponding to the selected output destination.

The present example includes the exemplary debug message housed in a receive (rx) data packet for transmission to the host device 28. The firmware module 40 encapsulates the rx data packet in a RxPD header. The RxPD header includes a Rx Packet Type field 62. In the present example, the Rx Packet Type field 62 includes a value of "PKT_TYPE_DEBUG" indicating that the subsequent rx data packet is of a debug type.

The exemplary rx data packet includes a debug type field 64, a reserved field 66, and the exemplary debug message. The debug type field 64 includes a value of "2" that distinguishes a small debug print operation from various other debug print operations. The reserved field 66 includes 3 bytes of information reserved for various other operations and/or use. A driver module (not shown) of the host device 28 directs the transmission 60 to the viewer module 50 for processing based on the Rx Packet Type field 62 and the debug type field 66.

Figure 8:
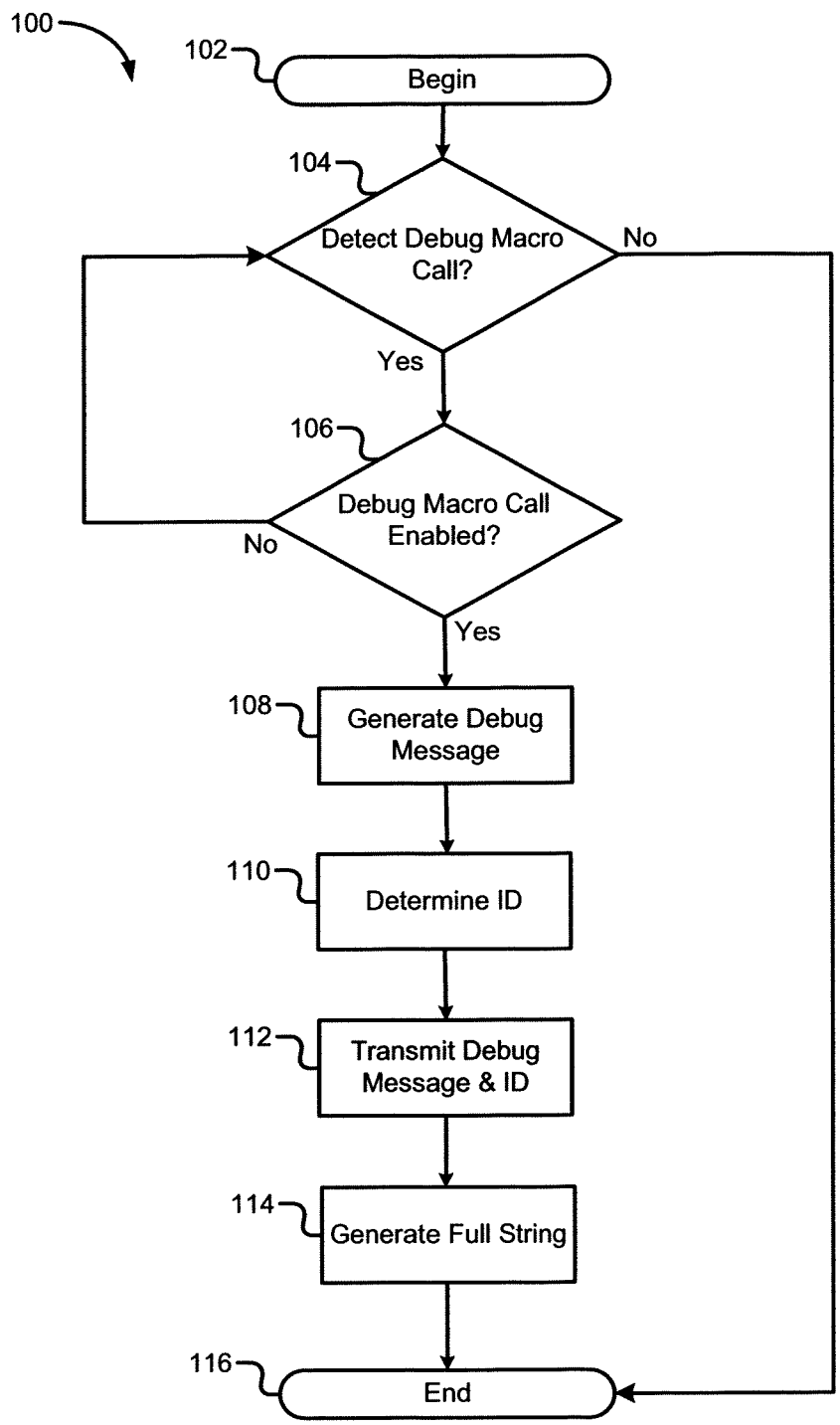
FIG. 8 is a flow diagram illustrating steps of executing the exemplary print system according to the present disclosure.

Referring to FIG. 8, a method 100 of performing a debug print operation within the client station 12 is shown in more detail. The method 100 begins at step 102. In step 104, the firmware module 40 determines whether a debug macro call has been detected. If the firmware module 40 does not detect a debug macro call, the method 100 proceeds to step 116. If the firmware module 40 does detect a debug macro call, the method proceeds to step 106.

In step 106, the firmware module 40 determines whether the debug macro call has been enabled based on the associated ID. If the firmware module 40 determines that the debug macro call has not been enabled, the method 100 returns to step 104. If the firmware module 40 determines that the debug macro has been enabled, the method 100 proceeds to step 108. In step 108, the firmware module 40 generates a debug message based on the debug macro call.

In step 110, the firmware module 40 determines an ID that corresponds to the debug message. In step 112, the firmware module 40 transmits the debug message and corresponding ID to the host device 28. In step 114, the host device 28 generates a full string of data based on the debug message and corresponding ID. In step 116, the method 100 ends.

Referring now to FIGS. 9(*a*) to 9(*h*), various exemplary implementations of the present invention are shown. Referring to FIG. 9(*a*), the present invention may be embodied in a hard disk drive (HDD) 400. HDD 400 may communicate with a host device (not shown) such as a computer, mobile computing devices such as personal digital assistants, cellular phones, media or MP3 players and the like, and/or other devices via one or more wired or wireless communication links 408.

The present invention may be implemented with either or both signal processing and/or control circuits, which are generally identified in FIG. 9(*a*) at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406. HDD 400 may be connected to memory 409, such as random access memory (RAM), a low latency nonvolatile memory such as flash memory, read only memory (ROM) and/or other suitable electronic data storage.

Referring now to FIG. 9(*b*), the present invention may be implemented in a digital versatile disc (DVD) drive 410. The present invention may be implemented in either or both signal processing and/or control circuits, which are generally identified in FIG. 9(*b*) at 412, and/or mass data storage 418 of DVD drive 410. Signal processing and/or control circuit 412 and/or other circuits (not shown) in DVD drive 410 may process data, perform coding and/or encryption, perform calculations, and/or format data that is read from and/or data written to an optical storage medium 416. In some implementations, signal processing and/or control circuit 412 and/or other circuits (not shown) in DVD drive 410 can also perform other functions such as encoding and/or decoding and/or any other signal processing functions associated with a DVD drive.

DVD drive 410 may communicate with a device (not shown) such as a computer, television or other device via one or more wired or wireless communication links 417. DVD drive 410 may communicate with mass data storage 418 that stores data in a nonvolatile manner. Mass data storage 418 may include a HDD such as that shown in FIG. 9(*a*). The HDD may be a mini HDD that includes one or more platters having a diameter that is smaller than approximately 1.8". DVD drive 410 may be connected to memory 419, such as RAM, ROM, low latency nonvolatile memory such as flash memory, and/or other suitable electronic data storage.

Referring now to FIG. 9(*c*) the present invention may be embodied in a high definition television (HDTV) 420. The present invention may be implemented in either or both signal processing and/or control circuits, which are generally identified in FIG. 9(*c*) at 422, a WLAN interface 429 and/or mass data storage 427 of the HDTV 420. HDTV 420 may receive HDTV input signals in either a wired or wireless format via one or more wired or wireless communication links 424 and generate HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in either FIG. 9(*a*) and/or at least one DVD may have the configuration shown in FIG. 9(*b*). The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429.

Referring now to FIG. 9(*d*), the present invention may be implemented in a control system of a vehicle 430, a WLAN interface 448 and/or mass data storage 446 of the vehicle control system. In some implementations, the present invention is implemented in a power-train control system 432 that receives inputs from one or more sensors 436 such as temperature sensors, pressure sensors, rotational sensors, airflow sensors and/or any other suitable sensors and/or that generates one or more output control signals such as engine operating parameters, transmission operating parameters, and/or other control signals at one or more output(s) 438.

The present invention may also be embodied in other control systems 440 of vehicle 430. Control system 440 may likewise receive signals from input sensors 442 and/or output control signals to one or more output(s) 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices, for example HDDs and/or DVDs. At least one HDD may have the configuration shown in FIG. 9(*a*) and/or at least one DVD may have the configuration shown in FIG. 9(b). The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448. The control system 440 may also include mass data storage, memory and/or a WLAN interface (all not shown).

Figure 9B:
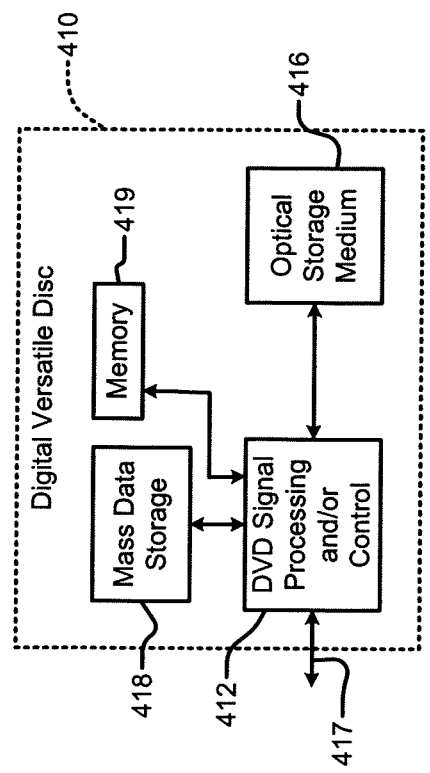
FIG. 9($a$) is a functional block diagram of a hard disk drive.
Figure 9A:
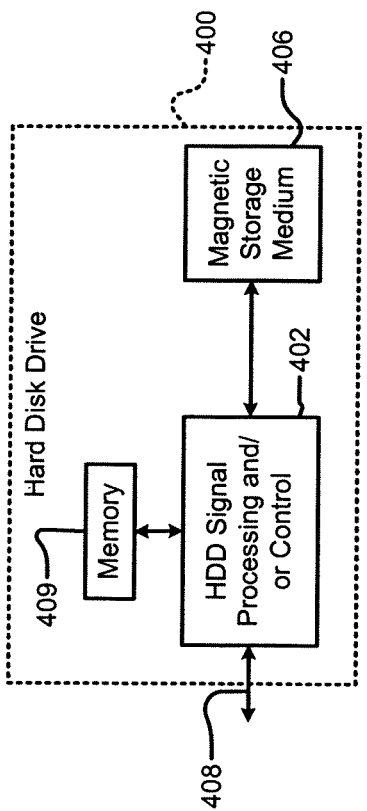
Figure 9D:
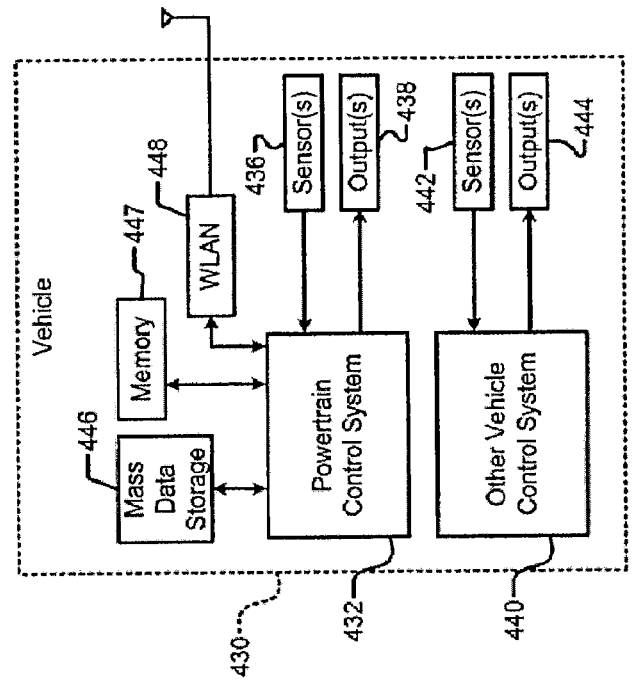
Figure 9C:
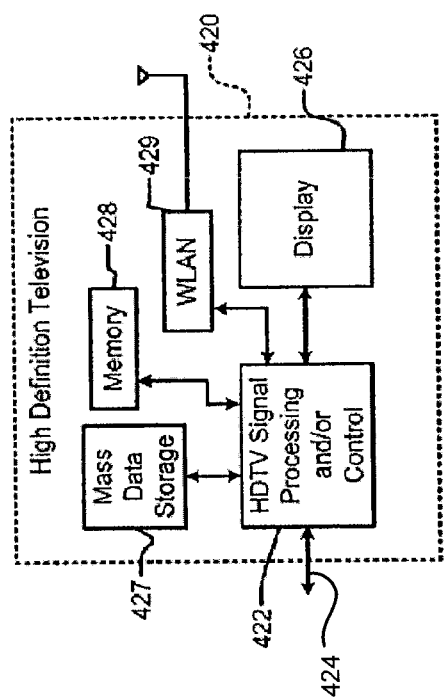
Figure 9E:
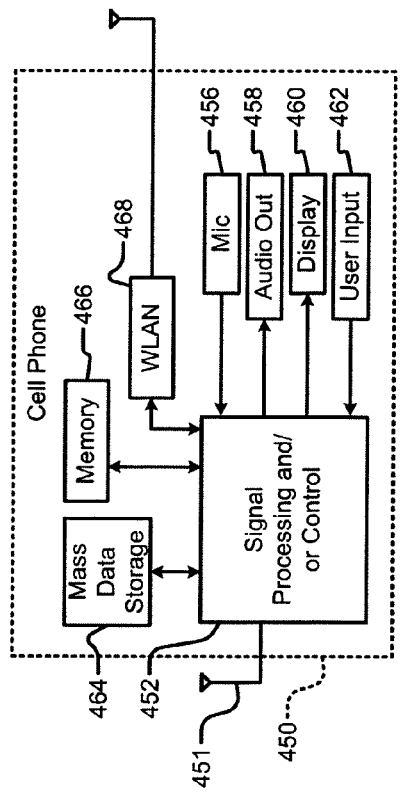

Referring now to FIG. 9(e), the present invention may be embodied in a cellular phone 450 that may include a cellular antenna 451. The present invention may be implemented in either or both signal processing and/or control circuits, which are generally identified in FIG. 9(e) at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices, for example HDDs and/or DVDs. At least one HDD may have a configuration shown in FIG. 9(a) and/or at least one DVD may have the configuration shown in FIG. 9(b). The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 9F:
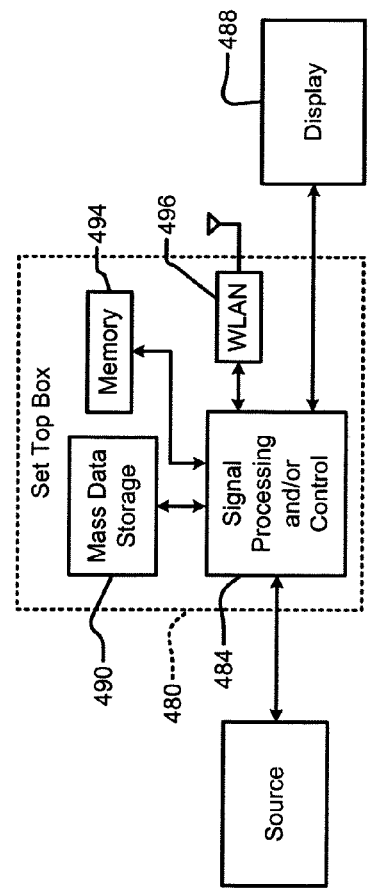

Referring now to FIG. 9(f), the present invention may be embodied in a set top box 480. The present invention may be implemented in either or both signal processing and/or control circuits, which are generally identified in FIG. 9(f) at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices, for example HDDs and/or DVDs. At least one HDD may have a configuration shown in FIG. 9(a) and/or at least one DVD may have the configuration shown in FIG. 9(b). The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496.

Figure 9G:
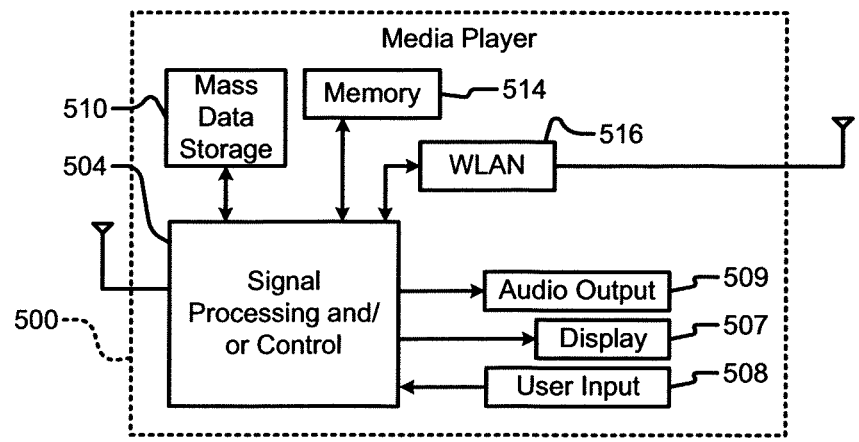

Referring now to FIG. 9(g), the present invention may be embodied in a media player 500. The present invention may be implemented in either or both signal processing and/or control circuits, which are generally identified in FIG. 9(g) at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage 510 may include optical and/or magnetic storage devices, for example HDDs and/or DVDs. At least one HDD may have a configuration shown in FIG. 9(a) and/or at least one DVD may have the configuration shown in FIG. 9(b). The HDD may be a mini HDD that includes one or more platters having a diameter that is smaller than approximately 1.8".

Media player 500 may be connected to memory 514 such as RAM, ROM, low latency nonvolatile memory such as flash memory and/or other suitable electronic data storage. Media player 500 also may support connections with a WLAN via a WLAN network interface 516. Still other implementations in addition to those described above are contemplated.

Figure 9H:
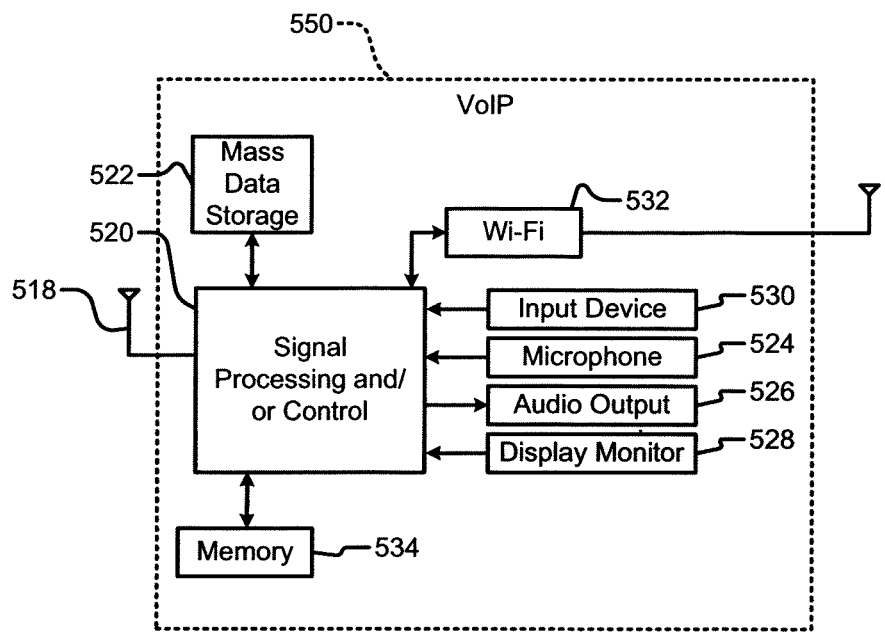

Referring to FIG. 9(h), the present invention may be embodied in a Voice over Internet Protocol (VoIP) phone 550 that may include an antenna 518. The present invention may be implemented in either or both signal processing and/or control circuits, which are generally identified in FIG. 9(h) at 520, a wireless interface and/or mass data storage of the VoIP phone 550. In some implementations, VoIP phone 550 includes, in part, a microphone 524, an audio output 526 such as a speaker and/or audio output jack, a display monitor 528, an input device 530 such as a keypad, pointing device, voice actuation and/or other input devices, and a Wi-Fi communication module 532. Signal processing and/or control circuits 520 and/or other circuits (not shown) in VoIP phone 550 may process data, perform coding and/or encryption, perform calculations, format data and/or perform other VoIP phone functions.

VoIP phone 550 may communicate with mass data storage 522 that stores data in a nonvolatile manner such as optical and/or magnetic storage devices, for example HDDs and/or DVDs. At least one HDD may have a configuration shown in FIG. 9(a) and/or at least one DVD may have the configuration shown in FIG. 9(b). The HDD may be a mini HDD that includes one or more platters having a diameter that is smaller than approximately 1.8". VoIP phone 550 may be connected to memory 534, which may be a RAM, ROM, low latency nonvolatile memory such as flash memory and/or other suitable electronic data storage. VoIP phone 550 is configured to establish communications link with a VoIP network (not shown) via Wi-Fi communication module 532.

All of the discussion above, regardless of the particular implementation being described, is exemplary in nature, rather than limiting. Although specific components of the print system are described, methods, systems, and articles of manufacture consistent with the print system may include additional or different components. For example, components of the print system may be implemented by one or more of control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the print system may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. A network device comprising:
a network interface configured to communicate with a host device and a wireless network,
wherein said network interface comprises:
a firmware module that is configured to:
determine enablement of a macro call;
in response to determining enablement of said macro call, generate a first portion of a first message for output by a viewer module designated as one of at least one output destination in a network designated by said host device, wherein said first portion is generated for a substitution of a second portion of said first message and for a combination with a remaining portion of said first message, said remaining portion residing with said viewer module, wherein said first portion comprises one of a variable number of arguments and state data of said firmware module, and wherein said remaining portion comprises predetermined characters associated with said macro call;
transmit a second message to said viewer module, wherein said second message comprises said first portion and an identification parameter corresponding to said remaining portion, wherein, upon receipt of the second message, said viewer module identifies said predetermined characters based on said identification parameter, substitutes said first portion for said second portion and combines said first portion with said remaining portion to generate a complete set of data associated with said macro call, and outputs said complete set of data as said first message, said complete set of data comprising said predetermined characters and said one of said variable number of arguments and said state data; and
a memory module that is configured to store said first portion.

2. The network device of claim 1 wherein said first portion is included in a value field of said second message.

3. The network device of claim 1 wherein said enablement of said macro call comprises a selective enablement of said macro call based on mask data and said identification parameter,
wherein said memory module is configured to store said first portion after said macro call is selectively enabled.

4. The network device of claim 3 wherein said firmware module is configured to generate said second message and said memory module is configured to store said second message when said macro call is enabled.

5. The network device of claim 4 wherein said firmware module is configured to dequeue said second message from said memory module for transmission to at least one of said at least one output destination.

6. The network device of claim 3 wherein said host device is configured to selectively enable a plurality of macro calls based on said mask data and a plurality of identification parameters that respectively correspond to each of said plurality of macro calls, wherein said plurality of macro calls and said plurality of identification parameters include said macro call and said identification parameter, respectively.

7. The network device of claim 6 wherein said firmware module is further configured to:
respectively generate a plurality of messages based on said plurality of macro calls; and
store said plurality of messages to said memory module when said plurality of macro calls are enabled, wherein said plurality of messages includes said second message.

8. The network device of claim 7, wherein said at least one designated output destination comprises said host, and wherein said firmware module is further configured to transmit at least one of said plurality of messages from said memory module to said host device based on a request command received from said host device.

9. The network device of claim 7, wherein said at least one designated output destination comprises a network analyzer, and wherein said firmware module is further configured to transmit at least one of plurality of messages from said memory module to said network analyzer based on a request command received from a node, wherein said node communicates with an access point of a network system.

10. The network device of claim 5 wherein said firmware module is further configured to generate said state data that includes at least one of a state of each of a plurality of state machines of said firmware module, a state of each of a plurality of global variables of said firmware module, and a state of each of a plurality of media access control registers of said firmware module.

11. The network device of claim 10 wherein said firmware module is further configured to generate a data packet that includes one of said second message and said state data for transmission to at least one of said plurality of output destinations.

12. The network device of claim 10 wherein said firmware module is further configured to:
transmit said state data to said host device based on a request command received from said host device; and transmit said state data to a network analyzer based on a different request command received from a node, wherein said node communicates with an access point of a network system.

13. The network device of claim 10 wherein said firmware module is further configured to broadcast said state data to a network system based on a request command received from a node, wherein said node is not associated with an access point of said network system.

14. The network device of claim 1, wherein said macro call comprises a debug macro call, and wherein said firmware module is further configured to execute a debug operation in response to enablement of said debug macro call to generate said first portion of said message.

15. The network device of claim 1, wherein said second portion comprises one or more conversion specifiers.

16. A method for operating a network interface that is configured to communicate with a host device and a wireless network, said method comprising:
    determining, with said network interface, enablement of a macro call;
    in response to determining enablement of said macro call, generating, with said network interface, a first portion of a first message corresponding to said macro call, said first message for output by a viewer module designated as one of at least one output destination in a network designated by said host device, wherein said first portion is generated for a substitution of a second portion of said first message and for a combination with a remaining portion of said first message, said remaining portion residing with said viewer module, wherein said first portion comprises one of a variable number of arguments and state data of said firmware module, and wherein said remaining portion comprises predetermined characters associated with said macro call; and
    transmitting, with said network interface, a second message to said viewer module, wherein said second message comprises said first portion and an identification parameter corresponding to said remaining portion, wherein, upon receiving the second message, said viewer module identifies said predetermined characters based on said identification parameter, substitutes said first portion for said second portion and combines said first portion with said remaining portion to generate a complete set of data associated with said macro call, and outputs said complete set of data as said first message, said complete set of data comprising said predetermined characters and said one of said variable number of arguments and said state data; and
    storing, with a memory module of said network interface, said first portion.

17. The method of claim 16 wherein said first portion is included in a value field of said second message.

18. The method of claim 16 further comprising storing, with said memory module of said network interface, said second message after said host device selectively enables said macro call based on mask data and said identification parameter.

19. The method of claim 18 further comprising generating, with said network interface, said second message and storing said second message to said memory module when said macro call is enabled.

20. The method of claim 19 further comprising dequeuing, with said network interface, said second message from said memory module for transmission to at least one of said at least one output destination.

21. The method of claim 18 further comprising selectively enabling, with said host device, a plurality of macro calls based on said mask data and a plurality of identification parameters that respectively correspond to each of said plurality of macro calls, wherein said plurality of macro calls and said plurality of identification parameters include said macro call and said identification parameter, respectively.

22. The method of claim 21 further comprising respectively generating, with said network interface, a plurality of messages based on said plurality of macro calls and storing, with said network interface, said plurality of messages to said memory module when said plurality of macro calls are enabled, wherein said plurality of messages includes said second message.

23. The method of claim 22 further comprising transmitting, with said network interface, at least one of said plurality of messages from said memory module to said host device based on a request command received from said host device.

24. The method of claim 22 further comprising transmitting, with said network interface, at least one of said plurality of messages from said memory module to a network analyzer based on a request command received from a node, wherein said node communicates with an access point of a network system that includes said network interface.

25. The method of claim 20 further comprising generating, with said network interface, said state data that includes at least one of a state of each of a plurality of state machines of said firmware module, a state of each of a plurality of global variables of said firmware module, and a state of each of a plurality of media access control registers of said firmware module.

26. The method of claim 25 further comprising generating, with said network interface, a data packet that includes one of said second message and said state data for transmission to at least one of said plurality of output destinations.

27. The method of claim 25 further comprising transmitting, with said network interface, said state data to said host device based on a request command received from said host device and transmitting, with said network interface, said state data to a network analyzer based on a different request command received from a node, wherein said node communicates with an access point of a network system that includes said network interface.

28. The method of claim 25 further comprising broadcasting, with said network interface, said state data to a network system to which said network interface is connected based on a request command received from a node, wherein said node is not associated with an access point of said network system.

29. The method of claim 16, wherein said macro call comprises a debug macro call, the method further comprising: executing, with the network interface, a debug operation in response to determining enablement of said debug macro call to generate said first portion of said message.

30. The method of claim 16, wherein said second portion comprises one or more conversion specifiers.

* * * * *